United States Patent [19]

Spellman

[11] Patent Number: 4,580,750
[45] Date of Patent: Apr. 8, 1986

[54] RESTAURANT TRAY SUPPORT STAND

[76] Inventor: Stanley Spellman, 75 Cedar Dr., Roslyn, N.Y. 11576

[21] Appl. No.: 689,444

[22] Filed: Jan. 7, 1985

[51] Int. Cl.[4] ............................................. F16M 11/32
[52] U.S. Cl. ...................................... 248/164; 108/90; 108/93; 108/118; 248/434
[58] Field of Search .............. 248/164, 434, 432, 150; 297/135, 417, 45; 108/118, 92, 90, 93; 182/206

[56] References Cited

U.S. PATENT DOCUMENTS

| | | | |
|---|---|---|---|
| 1,205,594 | 11/1916 | Close | 182/206 |
| 2,434,800 | 1/1948 | Hollander | 248/150 |
| 2,644,506 | 7/1953 | Pollack et al. | 297/135 X |
| 2,746,822 | 5/1956 | Copenhaver | 248/188.5 |
| 2,802,578 | 8/1957 | Barile | 248/164 X |
| 3,498,668 | 3/1970 | Vanderminden | 297/45 |
| 3,726,237 | 4/1973 | Devey et al. | 108/92 |
| 4,262,606 | 4/1981 | Hodson | 248/164 |

Primary Examiner—J. Franklin Foss
Assistant Examiner—David L. Talbott
Attorney, Agent, or Firm—Bauer & Amer

[57] ABSTRACT

Pivotal attachments are incorporated in the construction of a restaurant tray support stand which provide the option of doubling the tray-supporting capacity thereof, without necessitating any significant complicating changes in construction or mode of use. The inventive stand is still easy to position, set-up and use, either with one or, according to the present invention, a second tray support area or station.

3 Claims, 15 Drawing Figures

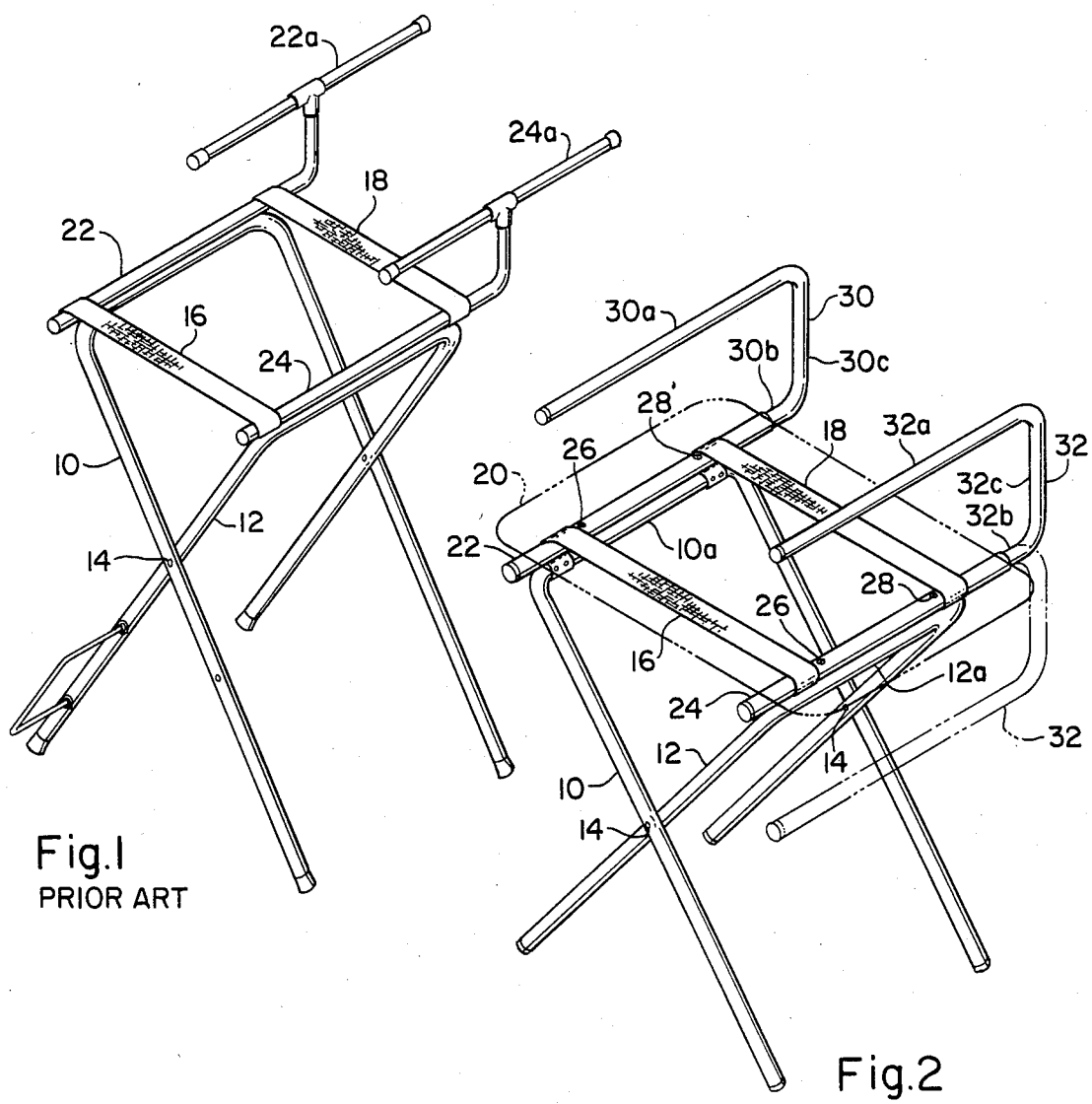
Fig.1 PRIOR ART
Fig.2
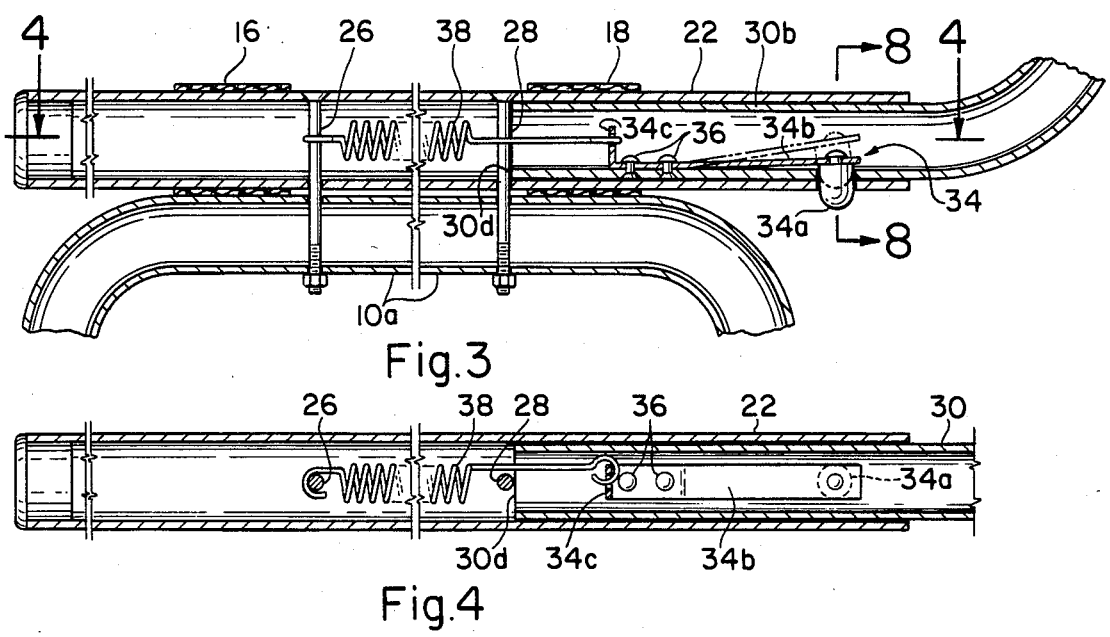
Fig.3
Fig.4

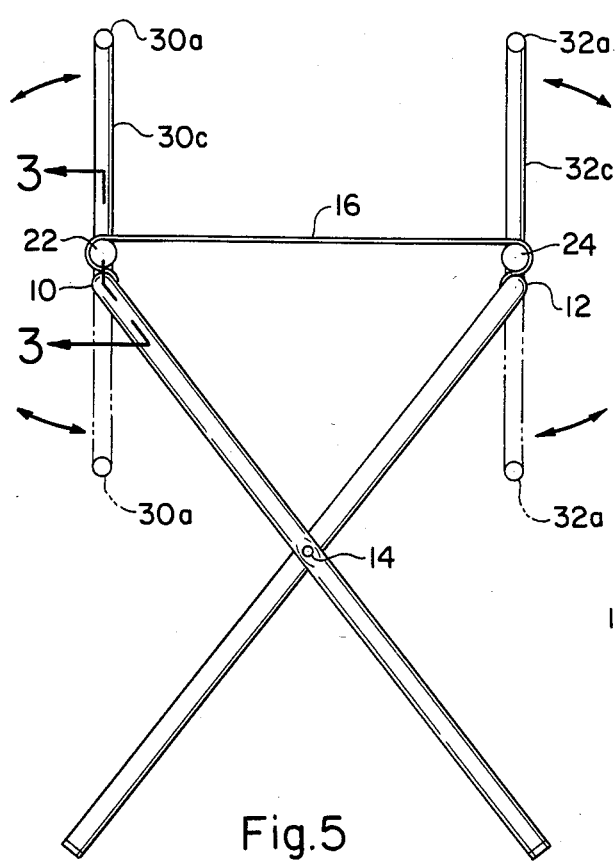
Fig.5
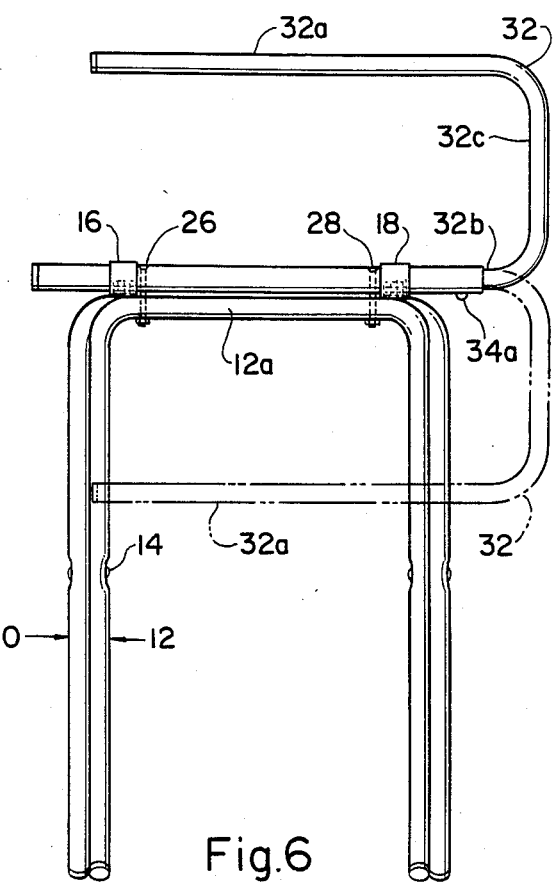
Fig.6
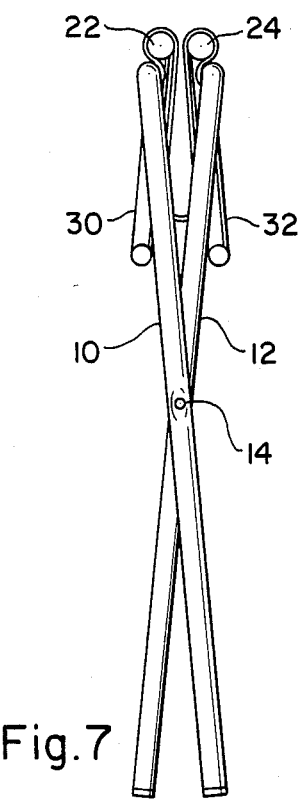
Fig.7
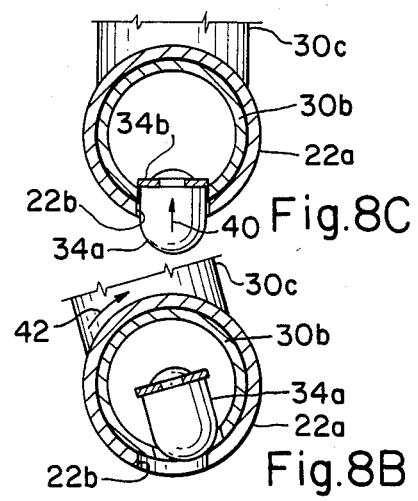
Fig.8C
Fig.8B
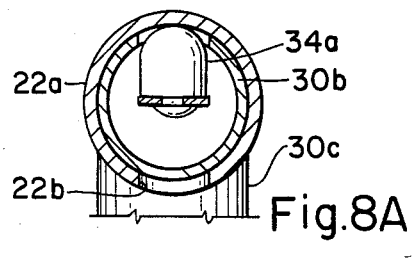
Fig.8A

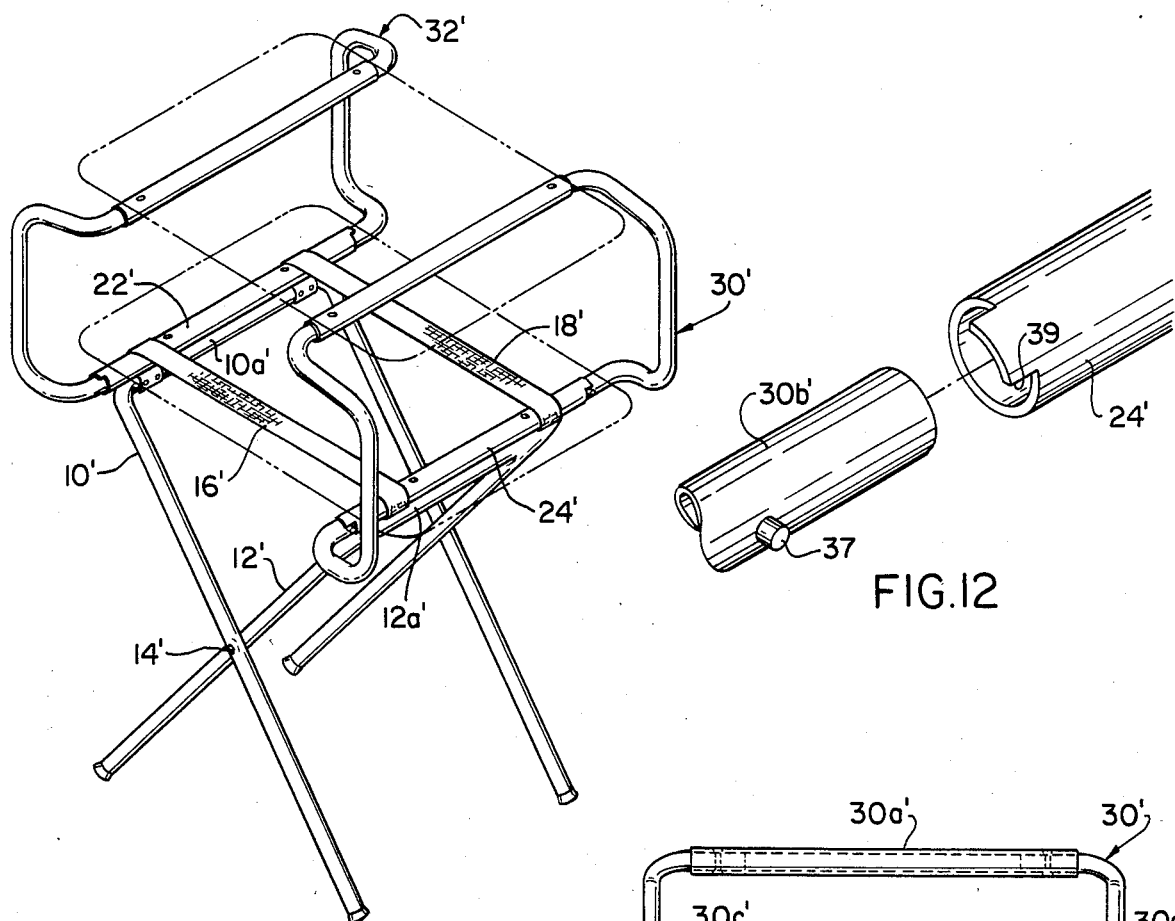
FIG.9
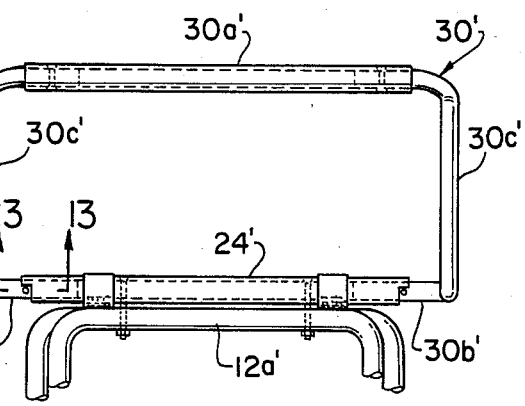
FIG.12
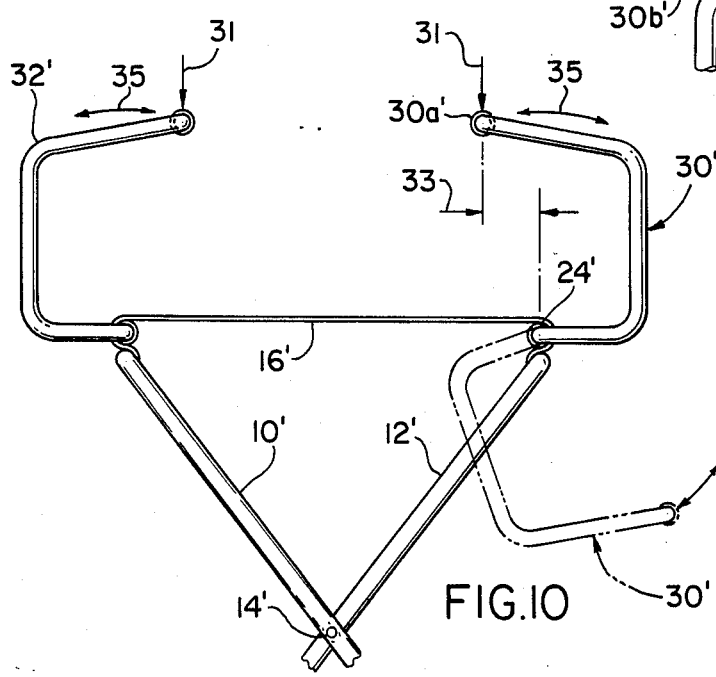
FIG.10
FIG.11
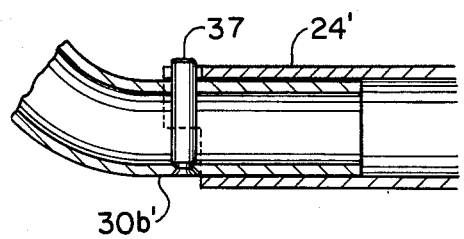
FIG.13

RESTAURANT TRAY SUPPORT STAND

The present invention relates generally to restaurant tray supports, and more particularly to a novel two-tier version.

Lightweight restaurant tray supports with unfolding U-shaped legs, the spread apart upper horizontal leg portions of which serve as the tray support are, of course, already well known. These supports are easily moved into strategic position by the waiter, because they are lightweight and open, or unfold, so easily, are not a hazard to people walking in the vicinity, and thus enable the waiter to effectively work with a tray supported thereon, either by removing the meals ordered which have been carried on the tray or loading soiled dishes thereon preparatory to their removal.

Improvements to these tray supports have not, heretofore, been forthcoming, probably because they have introduced such shortcomings as unnecessarily complicating the construction thereof, or have detracted from the facilitated set-up and use which now characterize this product.

Broadly, it is an object of the present invention to provide an improved restaurant tray support overcoming the foregoing and other shortcomings of the prior art. More particularly, it is an object to double the tray supporting capacity of this product, but without adverse effect on its presently simple construction and mode of use.

One improved embodiment of a restaurant tray support demonstrating objects and advantages of the present invention is of a novel two-tier variety, and includes a pair of criss-crossed legs serving as said stand and wherein each leg has an upper horizontally oriented length portion having attached thereto a tubular member which serves as a lower tray support. In each said tubular member, a U-shaped member is inserted to serve as an upper tray support. To this end, each said U-shaped member has an operative position in which one leg is projected for pivotal movement within a cooperating tubular member and, as a result, its opposite leg is movable through a pivotal traverse into a clearance position which establishes an upper tray support above the lower tray support, thereby providing the referred to two tiers. Completing the construction are interengaging means on the tubular and on the U-shaped members for selectively holding the clearance positions of the U-shaped members when it is desired to make use thereof as an upper tray support.

In another embodiment, the construction is simplified by using arcuate or curved U-shaped members that assume a position of rotation past a so called "dead center" point, which maintains the tray-supporting positions of these U-shaped members without any interengaging means on these U-shaped members and on the tubular members in which they are journaled for rotation.

The above description, as well as further objects, features and advantages of the present invention will be more fully appreciated with reference to the following detailed description of presently preferred, but nonetheless illustrative embodiments in accordance with the present invention, when taken in conjunction with the accompanying drawings, wherein:

FIG. 1 is a perspective view of a prior art structure which is superficially similar to the inventive structure herein;

FIG. 2 is similarly a perspective view, but of a first embodiment of the inventive structure in which positions of movement of the components forming the upper tray support are illustrated in full line and phantom line perspective;

FIG. 3 is a partial side elevational view illustrating details of the manner in which the components providing said upper tray support are pivotally mounted so as to partake of the pivotal traverses illustrated in FIG. 2;

FIG. 4 is a plan view in section, taken along line 4—4 of FIG. 3, illustrating further structural details;

FIG. 5 is an end view of the two-tier tray support stand hereof, in which again the positions of movement of tray-supporting components thereof are illustrated in full line and phantom line perspective;

FIG. 6 is a side elevational view projected from FIG. 5 showing further structural details of the stand;

FIG. 7, like FIG. 5, is an end view of the stand, but illustrating the stand in its folded or storage condition;

FIGS. 8A–8C are related views, in section, taken along line 8—8 of FIG. 3 illustrating how a detent is arranged to selectively hold the tray-supporting components in their position of movement in which they effectively serve as an upper tray support and, when it is desired, to release these components;

FIG. 9 is a perspective view of a second embodiment of the inventive restaurant tray stand hereof, in which the trays are illustrated in phantom perspective;

FIG. 10 is a partial front elevational view in which the positions of movement of the components forming the upper tray support are illustrated in full line and phantom line perspective;

FIG. 11 is a partial side elevational view showing details of the manner in which control is exercised over the relative movement of the upper tray support components;

FIG. 12 is an exploded isometric view showing further structural details of how the upper tray support components are journaled for rotation; and FIG. 13 is a sectional view taken along line 13—13 of FIG. 11.

The inventive product hereof is a support stand for trays of the type commonly found and used in restaurants. As such, it consists of two U-shaped tubular members 10 and 12, which are pivotally connected at two locations, as at 14, so that they can partake of opening and closing movement relative to each other and can thus assume an open operative tray supporting condition as illustrated in FIG. 2 or a compact closed storage condition, as illustrated in FIG. 7. Fabric bands 16 and 18 are appropriately connected to the horizontally oriented tubular portions 10a and 12a, respectively, of the U-shapes 10, 12 to thus limit, for well understood reasons, the opening movement of the stand, but not before the stand opens to an extent that it can function as a stable support for a tray to be placed thereon, as illustrated in phantom perspective and by the numeral 20 in FIG. 2.

In accordance with the typical and well known construction of a tray support to which the inventive improvements hereof are applied, the construction of the prior art and known stand is completed by tubular members 22 and 24 which are respectively attached to the previously referred to horizontal length portions 10a and 12a by two spaced apart bolts 26 and 28, which bolts are best illustrated in the cross sectional view of FIG. 3.

Before proceeding with the description of the within invention, it is helpful to acknowledge that in the prior art, and more particularly in U.S. Pat. No. 4,421,874, there is a two-tier stand which is superficially similar to that proposed herein. Thus, as shown in FIG. 1, the prior art stand also consists of two legs 10 and 12 pivotally connected at 14 and joined by upper bands 16 and 18 so that the attached horizontally oriented members 22 and 24 serve as a lower support, while attached as extensions of the members 22 and 24 are additionally horizontally oriented bars 22a and 24a which effectively serve as an upper support. However, the prior art stand of FIG. 1 and particularly that of U.S. Pat. No. 4,321,874 is not intended to serve as a support for trays and thus for restaurant use, and, even more important, the upper support provided by the bars 22a and 24a are always in the operative condition illustrated. It is undoubtedly for this reason that they are offset with respect to the members 22 and 24 so that they do not interfere with material intended to be supported on the members 22 and 24. However, even with the offset, the fact that the bars 22a and 24a extend laterally, as illustrated, they might be inadvertently contacted by a waiter or customer passing in the vicinity of the stand, and thus the prior art structure of FIG. 1 would not be suitable for restaurant use which is the primary and significant end use of the two-tier tray support stand of the present invention.

To solve the shortcomings of the prior art stand as just described, it is therefore proposed in accordance with the present invention to incorporate in the construction of the within inventive stand pivotally movable U-shaped members 30 and 32.

Since the members 30 and 32 are identically incorporated in the construction of the within inventive stand so as to partake of pivotal movement, the description of how this is done with respect to member 30 should suffice for a complete understanding of the invention, and, for brevity's sake, will not be repeated with respect to member 32.

As is perhaps best shown in FIGS. 3 and 4, to which figures reference should now be made in conjunction with FIG. 2, member 30 has two horizontally oriented legs 30a and 30b and a connecting medial portion 30c. Leg 30b is appropriately sized and is provided with an operative position in which it is projected within a cooperating end of the tubular member 22, with the result that an end of the leg 30b abuts against the first encountered vertically oriented bolt 28. Disposed within the cylindrical compartment formed in the end of the leg 30b is a detent mechanism, generally designated 34, which consists of a detent 34a per se appropriately attached at one end to a spring 34b which at its opposite end, as at 36, is attached to the leg 30b. Just beyond the pivots 36 the spring 34b terminates in an upstanding lip 34c to which is attached one end of a helical spring that is attached at its opposite end to the other vertically oriented bolt 26. As a result, spring 38 exerts a bias in the appropriate direction for maintaining each of the members 30 and 32 against bolt 28, which effectively functions as a stop, while at the same time permitting rotative movement in each of these members so that they can partake of the pivotal traverses illustrated in phantom line and full line perspective in FIGS. 2, 5 and 6. These pivotal traverses are, of course, possible because the springs 38 are of a helical configuration and rotative movement is a degree of movement that is compatible with the helical turns of the springs 38.

To hold the members 30 and 32 in their position of movement in which their respective legs 30a and 32a are in a clearance position above the tubular members 22 and 24 which serve as the lower tray support station, and wherein said legs 30a and 32a serve as the upper tray support, use is preferably made of the previously referred to detent mechanism 34. Thus, as best shown in the consecutive views 8A–8C, when each of the U-shaped members, as exemplified by member 30, is in its storage or out-of-the-way position, the detent 34a is within the hollow cylindrical compartment of the leg 30b and thus 180 degrees out of phase with a detent-sized opening 10b of the tubular member 10a, all as clearly illustrated in FIG. 8A. Proceeding to FIG. 8C, it should be readily understandable that as a result of a 180 degree pivotal traverse of leg 30b within the tube 10a that this will result in the detent 34a registering with, and thus projecting through the opening 10b, all as is clearly illustrated in FIG. 8C. As a result, leg 30b will be held against rotative movement, and thus the member 30 will correspondingly be held in its clearance position above the tubular member 22 and thus in that operative position in which it effectively serves, in cooperation with the other member 32, as an upper tray support.

As should readily be understood from progressive examination of FIGS. 8C and 8B, by depressing the detent 34a in the direction 40, and rotating the members 30 and 32 to the outside of the operative area of the lower tray support, which in FIG. 8B is in a clockwise direction 42 for the member 30, each of the members 30 and 32 are released from their tray-supporting position and will assume an out-of-the-way position under the leg portions 10a and 12a and thus in the open area between the criss-crossed legs 10 and 12, all as is illustrated in phantom perspective in FIGS. 2, 5 and 6.

Moreover, and as best illustrated in FIG. 7, the entire tray stand, despite the attachment thereto of the additional members 30 and 32 is readily adapted to assume the compact storage condition of FIG. 7.

Although the detent mechanism 34 is preferred, it should be readily appreciated that other forms of interfitting structure on the tubular supports 10a, 12a and the cooperating legs 30b, 32b which are mounted for rotation therein, can be substituted for the detent mechanism 34. For example, a lateral projection on each of the legs 30b, 32b can be arranged to project into a holding slot in the end of the tubular supports 22, 24 when the legs 30a and 32a are in their clearance position above the tubes 22 and 24. As a result, the members 30 and 32 will be held against rotation by the urgency of the springs 38. Then, in order to release these members from this position, the members need only be slightly withdrawn from their projected position with the ends of the tubes 22 and 24 and this, of course, will correspondingly withdraw the lateral projections from their cooperating notches. At this time, the members 30 and 32 can be urged through a pivotal traverse into their respective out-of-the-way positions. Thus, although not shown, the described mechanical equivalent for the detent mechanism 34 is intended to be within the contemplated scope of the invention.

In another contemplated embodiment, as shown in FIGS. 10–13, the detent mechanism 34 as well as any mechanical equivalent thereof can even be dispensed with, and the tray-supporting positions of the components of the upper tray support maintained without interengaging means, as will now be explained in connection with FIGS. 9-13.

In the embodiment of FIGS. 9-13 use is made of many of the same structural features as already described in connection with FIGS. 1-8, and thus, for brevity's sake this description will not be repeated and these similar structural features will be designated by the same, but primed, reference numerals. Thus, the stand of this embodiment also consists of two legs 10' and 12' pivotally connected at 14' and joined by upper bands 16' and 18' so that the attached horizontally oriented members 22' and 24', welded or otherwise attached to the legs 10a', 12a', serve as a lower support. Also in this embodiment to solve the shortcomings of the prior art stand of FIG. 1, are two upper tray-supporting pivotally movable inverted U-shaped members 30' and 32'. Unlike their counterparts 30 and 32, however, and for reasons soon to be described, the U-shaped members 30' and 32' are additionally of an arcuate or curved shape in profile, as may be best noted in FIG. 10.

Since the members 30' and 32' are identically incorporated in the construction of the within inventive stand so as to partake of pivotal movement, the description of how this is done with respect to member 30' should suffice for a complete understanding of the invention, and, for brevity's sake, will not be repeated with respect to member 32'.

As is perhaps best shown in FIGS. 10-13, to which figures reference should now be made in conjunction with FIG. 9, member 30' is formed with two side legs 30c' joined together at one end by a connecting leg 30a', which leg 30a' may be an added cylinder to in turn serve as an off-set or off-center weight for the member 30', for a reason soon to be obvious. Completing member 30' are two inturned leg portions 32b' which are inserted into its cooperating tubular member 24' so that member 30' is journaled for pivotal or rotational movement about the axis of the tubular member 24'.

Use of the cylinder 30a' is preferred not ony because it serves as a centrally located weight for each member 30', 32', but also because it facilitates assembly of these members in their cooperating tubular members 22', 24'. More particularly, each member 30', 32' is assembled in place by simultaneously inserting each end 30b' of each side 30c' into the end of the tubular member 22', 24' and the other end of each side 30c' in a friction fit in an end of the cylinder 30a'. Alternatively, the cylinder 30a' can be held by screws in a spanning position between the ends of the sides 30c'.

What is different in this embodiment, and as best illustrated in FIG. 10 is that member 30', and thus also member 32', has an arcuate or curved shape so that the weight 31 of the leg 30a' is offset a distance 33 to the inside of the rotation axis of the tubular member 24' in the upper or tray-supporting operative position of the member 30'. Stated somewhat differently, in said operative position of the member 30' it is in a position of rotation past "dead center", and thus will maintain this position even without any interconnecting means, such as the detent 34 previously described.

All that is required is to limit inward rotation 35 of the members 30', 32', and this is preferably achieved using a laterally extending pin 37 which in the FIG. 10 operative positions of the members 30', 32', abuts against a longitudinally extending edge 39 on the end of the tubular member 24'.

It will be understood that both embodiments of FIGS. 2 to 8 and of FIGS. 9 to 13 can be supplied as add-ons to conventional tray supports, rather than being constructed as a part thereof at the manufacturing facilities of the conventional tray supports. As an add-on, it is necessary only to attach the tubular members 22, 24 to the tray legs 10a, 12a using bolts 26 and 28 or the like, and the resulting structure will have the two tray-supporting stations previously described herein.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For use in a restaurant, a two-tier tray support stand comprising a pair of criss-crossed legs serving as said stand, each leg having an upper horizontally oriented length portion having attached thereto a tubular member correspondingly horizontally oriented so as to define a horizontally oriented rotation axis and also serving as a lower tray support, and in each said tubular member a U-shaped member serving as an upper tray support, each said U-shaped member having an operative position of one leg projected for pivotal movement within a cooperating one of said tubular members and having said opposite leg movable in rotation through a pivotal traverse about said rotation axis of said tubular member from an out-of-the-way storage position beneath said tubular member into a clearance position above each said tubular member so that said legs of said U-shaped members cooperate to establish an upper tray support above said lower tray support, and interengaging means on said tubular and said U-shaped members for selectively holding said clearance positions of said U-shaped members when it is desired to make use of said upper tray support.

2. A two-tier tray support stand as claimed in claim 1 wherein said horizontally oriented length portions of said legs and said tubular members are attached to each other by two vertically oriented spaced apart bolts, and a helical spring is connected in spanning relation between one said bolt and said leg of said U-shaped member projected within said tubular member so as to exert a spring bias thereon to maintain said projected position thereof, and said other bolt is located so as to be engaged by said inwardly projected legs and thus serve as a stop limiting the inward movement thereof to provide a selected plane of rotation, and a detent on said leg of said U-shaped member and a detent opening sized to receive said detent in said tubular member which is disposed in encircling relation about said leg, said plane of rotation being selected to provide a registration between said detent and said detent opening, whereby said detent is adapted to be engaged in said detent opening upon rotation of said U-shaped member to hold said upper tray support above said lower tray support.

3. For use in a restaurant, a two-tier tray support stand comprising a pair of criss-crossed legs serving as said stand, each leg having an upper horizontally oriented length portion having attached thereto a tubular member correspondingly horizontally oriented so as to define a horizontally oriented rotation axis and also serving as a lower tray support, and in each said tubular member an arcuate shaped U-shaped member serving as an upper tray support, each said arcuate shaped member being journaled for rotative movement in said tubular member about said rotation axis of said tubular member from an out-of-the-way storage position beneath said tubular member into a clearance position above each said tubular member to an extent of pivotal traverse so as to assume a position of rotation inwardly of the rotation axis of said tubular member and also in an operative position with respect thereto thereby establishing said upper tray support above said lower tray support for simultaneously supporting two trays thereon, and a weight on each said arcuate shaped member at a central location so as to retain its position of rotation when serving as said upper tray support.

* * * * *